United States Patent
Protz

(10) Patent No.: US 10,180,492 B2
(45) Date of Patent: Jan. 15, 2019

(54) MODULAR LASER IRRADIATION UNIT

(71) Applicant: MBDA Deutschland GmbH, Schrobenhausen (DE)

(72) Inventor: Rudolf Protz, Hoehenkirchen-Siegertsbrunn (DE)

(73) Assignee: MBDA Deutschland GmbH, Schrobenhausen (DE)

(*) Notice: Subject to any disclaimer, the term of this patent is extended or adjusted under 35 U.S.C. 154(b) by 0 days.

(21) Appl. No.: 14/441,625

(22) PCT Filed: Nov. 6, 2013

(86) PCT No.: PCT/DE2013/000650
§ 371 (c)(1),
(2) Date: May 8, 2015

(87) PCT Pub. No.: WO2014/071906
PCT Pub. Date: May 15, 2014

(65) Prior Publication Data
US 2015/0293210 A1    Oct. 15, 2015

(30) Foreign Application Priority Data
Nov. 9, 2012 (DE) .......... 10 2012 022 039

(51) Int. Cl.
*G01S 7/481* (2006.01)
*F41H 13/00* (2006.01)
*G01S 17/66* (2006.01)
*F41G 1/36* (2006.01)

(52) U.S. Cl.
CPC .......... *G01S 7/481* (2013.01); *F41G 1/36* (2013.01); *F41H 13/005* (2013.01); *G01S 17/66* (2013.01)

(58) Field of Classification Search
CPC ...... F41H 13/0062; F41H 13/005; F41G 1/36; F41G 7/2293; G01S 7/481; G01S 17/66
See application file for complete search history.

(56) References Cited

U.S. PATENT DOCUMENTS

| 3,541,468 A | 11/1970 | Hammond, Jr. et al. |
| 3,782,667 A * | 1/1974 | Miller, Jr. .......... F41G 7/263 244/3.13 |

(Continued)

FOREIGN PATENT DOCUMENTS

| DE | 32 02 432 A1 | 8/1983 |
| DE | 198 40 936 A1 | 3/2000 |

(Continued)

OTHER PUBLICATIONS

International Search Report (PCT/ISA/210) dated Apr. 14, 2014, with English translation (four (4) pages).

(Continued)

*Primary Examiner* — Marcus Taningco
(74) *Attorney, Agent, or Firm* — Crowell & Moring LLP

(57) ABSTRACT

A laser illumination unit for illuminating a target object with high-power laser radiation includes multiple rigidly-interconnected laser beam modules that are designed to emit laser radiation and an aiming unit to aim the laser beam modules at the target object. Each of the laser beam modules includes an optical element that is designed to aim laser radiation at a target point of the target object.

16 Claims, 4 Drawing Sheets

(56) References Cited

U.S. PATENT DOCUMENTS

| | | | | |
|---|---|---|---|---|
| 5,669,174 | A | * | 9/1997 | Teetzel ............... F41A 9/62 |
| | | | | 356/5.01 |
| 6,343,766 | B1 | | 2/2002 | Livingston |
| 6,407,535 | B1 | | 6/2002 | Friedman et al. |
| 7,405,834 | B1 | | 7/2008 | Marron et al. |
| 7,550,725 | B2 | * | 6/2009 | Hollander ............. G01J 5/0044 |
| | | | | 250/338.1 |
| 7,954,273 | B1 | * | 6/2011 | Swan ............... F41G 11/004 |
| | | | | 362/110 |
| 2003/0174315 | A1 | * | 9/2003 | Byren ............... G01B 11/26 |
| | | | | 356/152.1 |
| 2003/0206350 | A1 | | 11/2003 | Byren et al. |
| 2005/0252062 | A1 | * | 11/2005 | Scrogin ............... F41G 1/38 |
| | | | | 42/119 |
| 2009/0110019 | A1 | * | 4/2009 | Houde-Walter ........ F41G 3/145 |
| | | | | 372/55 |
| 2010/0282942 | A1 | * | 11/2010 | Mosier ............... F41H 13/005 |
| | | | | 250/203.2 |
| 2014/0307440 | A1 | | 10/2014 | Geidek et al. |

FOREIGN PATENT DOCUMENTS

| | | | |
|---|---|---|---|
| DE | 10 2010 051 097 A1 | 5/2012 | |
| DE | 10 2011 015 779 A1 | 10/2012 | |
| EP | 2 113 975 A2 | 11/2009 | |
| WO | WO 2010/129086 A1 | 11/2010 | |
| WO | WO 2012062399 A1 * | 5/2012 | ........... F41H 13/005 |

OTHER PUBLICATIONS

German-language Written Opinion (PCT/ISA/237) dated Apr. 14, 2014 (six (6) pages).
European Office Action issued in European counterpart application No. 13 817 850.4-1203 dated Jun. 12, 2018 (Seven (7) pages).
Singapore Search Report issued in Singapore counterpart application No. 11201502806Q dated Dec. 30, 2015 (Three (3) pages).
Singapore Written Opinion issued in Singapore counterpart application No. 11201502806Q dated Feb. 5, 2016 (Seven (7) pages).

* cited by examiner

MODULAR LASER IRRADIATION UNIT

FIELD OF THE INVENTION

The invention relates to a laser illumination unit and to a method for illuminating a target with laser radiation.

BACKGROUND OF THE INVENTION

High-power lasers are used both in the military and civilian spheres to process target objects. A high-power infrared laser, for example, can be used to illuminate a distant target object, such as munitions or an enemy target in order to damage or destroy the target object.

To this end, a corresponding laser illumination unit must generally detect the target object, generate the high-power infrared laser beam and aim the beam at the target object.

SUMMARY OF THE INVENTION

The object of the invention is to provide a laser illumination unit that is simple to maintain and simple to operate.

This object is achieved in accordance with the embodiments of the invention.

A first aspect of the invention relates to a laser illumination unit for illuminating a target object with high-power laser radiation. The laser illumination unit or the laser illumination device can be mounted, for example, on a vehicle or an aircraft.

In one embodiment of the invention, the laser illumination unit comprises multiple, rigidly-interconnected laser beam modules that are designed to emit laser radiation, and an aiming unit for aiming the laser beam modules at the target object, wherein each of the laser beam modules includes an optical element that is designed to aim and/or to focus the laser radiation at/on an aiming point of the target object The laser beam modules, for example, each include an identically constructed (for example, tubular) housing. The housings can be attached to each other by a shared frame. This frame can also accommodate additional modules, such as, for example, a camera module and/or an illumination module. The modules can be (roughly) aimed together at the target by the shared frame.

The laser illumination unit can comprise modules of identical constructive design that enable a material to be processed extremely precisely by a high-power beam in the range of several tens to one hundred kilowatts over large distances in the km range.

Possible applications for the laser illumination unit include, for example, decommissioning nuclear power plants or disposing of munitions. Military applications are also possible.

The modular design of the laser illumination unit using a plurality of modules enables the unit to be easily adapted to meet specific requirements. The specific laser output required can be easily modified, for example, based on the number of laser beam modules.

In one embodiment of the invention, the optical element of a laser beam module or all laser beam modules includes a detector to detect incoming radiation The laser illumination unit can be further modified so that each individual laser beam module includes a detector that is designed to detect incoming radiation (for example, from a target point on the target object) which is then used to adjust the optical element to align with i.e., aim at and/or focus on a target point.

In one embodiment of the invention, the optical element of a laser beam module includes an adjustable telescope that is designed to focus outgoing laser radiation on the target point and incoming radiation on a detector.

In one embodiment of the invention, the optical element of a laser beam module includes an adjustable deflection mirror that is designed to aim emitted laser radiation at the target point and aim incoming radiation at a detector.

It is understood that an illuminating or processing laser module can radiate emitted high-power laser radiation onto the target object and simultaneously detect incoming target-marking laser radiation. Analogously, a target-marking laser module can illuminate the target object and simultaneously detect incoming illumination radiation.

The deflection mirror can be swiveled in two axes by an actuator, such as, for example, an electric or piezoelectric motor, in order thereby to direct radiation from a target point (for adjusting the optical element) onto the detector and to aim radiation onto the target point (in order to illuminate the target point).

In one embodiment of the invention, the optical element of a laser beam module includes a semitransparent mirror that reflects the emitted laser radiation and is transparent to incoming radiation. This approach allows the radiation for the detector and the radiation that is intended to exit the laser beam module to be separated from each other. For example, the semitransparent mirror reflects only in the wavelength range of the emitted radiation but is transparent for other wavelength regions.

In one embodiment of the invention, a laser beam module includes a controller that is designed to control the actuator of an adjustable deflection mirror and/or an actuator of an adjustable telescope. Each laser beam module can have its own controller that is installed, for example, in the housing of the laser beam module, thereby enabling the laser illumination unit to be further modularized. The laser beam modules are able to use the controller to adjust the optical elements thereof independently.

In one embodiment of the invention, the laser illumination unit furthermore includes multiple laser sources that are designed to generate laser radiation and are each connected by an optical fiber to a laser beam module. The aiming unit can be designed to move the laser beam modules independently of the laser sources. The laser sources can be fiber lasers that can generate, for example, infrared light for the illumination laser beam modules and/or light in the visible spectrum for a target-marking laser beam module.

In one embodiment of the invention, the laser illumination unit furthermore includes multiple first (high-power, illumination, and/or processing) laser beam modules that are designed to emit first laser radiation of a first wavelength, and a second (target-marking) laser beam module that is designed to emit second laser radiation of a second wavelength and focus it on the target point.

The first laser beam modules can be designed to detect the second laser radiation by means of a detector and can include an adjustable optical element that aims the incoming second laser radiation at the detector and simultaneously aims the emitted first laser radiation at the target point. In other words, second laser radiation aimed at the target point, which radiation comes from a second laser module, can be used to aim and/or focus the first laser beam modules at/on the target point.

In one embodiment of the invention, the first laser radiation is capable of processing the target object. For example, the first laser radiation from a first laser beam module can have an output of between 1 kilowatt and 10 kilowatts.

In one embodiment of the invention, the second laser beam module is designed to use a detector to detect illumination radiation. In other words, illumination radiation aimed at the target point, which radiation comes from an illumination module, can be used to aim the second laser beam module at the target point.

The second laser beam module can include an adjustable optical element that aims and/or focuses the incoming illumination radiation at/on the detector and the emitted second laser radiation at/on the target point.

In one embodiment of the invention, the optical element of the laser beam modules are of identical design. Both the processing laser beam module and the target-marking laser beam modules can include an optical element comprising an adjustable telescope, an adjustable deflection mirror, and/or a semitransparent mirror that includes similar or identically constructed components.

In one embodiment of the invention, the laser illumination unit furthermore comprises a target illumination beam module that is rigidly attached to the laser beam modules, the latter module including an illumination source to generate illumination radiation and a telescope to focus the illumination radiation. The target illumination beam module that generates, for example, radiation in the visible spectrum can be used to illuminate the target object whenever the ambient light is insufficient.

In one embodiment of the invention, the laser illumination unit furthermore comprises a camera module that is rigidly attached to the laser beam modules, the camera module including a camera and a telescope. An image can be captured by the camera module, this image being of the specific area at which the laser beam modules are to be aimed. The image can be displayed on a display screen, thereby enabling a person to aim the camera module together with the other modules at the target object.

In one embodiment of the invention, the laser beam modules (and/or the target illumination module and/or the camera module) each include a tubular housing. The tubular housings can be combined to form a bundle (for example using a shared frame) that can be moved by the aiming unit. To this end the aiming unit can include one or more actuators that can move the bundle.

A first aspect of the invention relates to a method for illuminating a target object with high-power laser radiation. It is understood that the features of the method can be features of the laser illumination unit and vice versa.

In one embodiment of the invention, the method comprises the steps of: detecting a target point on a target object using a detector of a target-marking laser beam module, wherein the detector is designed to detect a wavelength that differs from a wavelength of a target acquisition laser radiation; aiming a target-marking laser beam at the target point by way of the target-marking laser beam module; adjusting the optical element of a processing laser beam module to aim target-marking laser radiation at a detector of the processing laser beam module, wherein the detector is designed to detect a wavelength of the target acquisition laser radiation; and illuminating the target point by way of a processing laser beam module, wherein the processing laser beam is aimed (and focused) by the optical element of the processing laser beam module, which optical element aims (and focuses) the target-marking laser radiation at the detector of the processing laser beam module.

For example, illumination light or illumination laser radiation that can emanate, for example, from an illumination module can be detected by the target-marking laser beam module. This can occur by adjusting an optical element of the target-marking laser module in order to aim the illumination laser radiation at a detector (for example, a camera) so that the target point is displayed at the center of the camera. The same optical element (which can include, for example, an adjustable deflection mirror for aiming the illumination laser radiation and/or an adjustable telescope to focus the target point on the detector) can be used to aim and to focus a target-marking laser beam at/on the target point.

The illumination laser module uses an optical element, which can be an optical element that is identical or constructed identically to the target-marking laser beam module, to detect the target-marking laser radiation from the target point. Analogously to the target-marking laser beam module, the illumination module adjusts the optical element thereof so that the target point is aimed at or focused on a detector (for example, a four-quadrant detector). The illumination laser can then use the same optical element to aim at and focus on the target point, and use the illumination laser radiation to process the target point.

The procedural steps mentioned immediately above can be used for making precise adjustments to aim the laser radiation at the target point of the target object.

In terms of rough adjustment or rough aiming of the laser illumination unit, the laser modules can be aimed together at the target object by being moved together, for example, by an aiming unit that can pivot on two axes.

The following discussion describes exemplary embodiments of the invention in more detail with reference to the attached figures.

BRIEF DESCRIPTION OF THE FIGURES

As a rule identical or analogous components are provided with the same reference numerals.

DETAILED DESCRIPTION OF EMBODIMENTS

Figure 1:
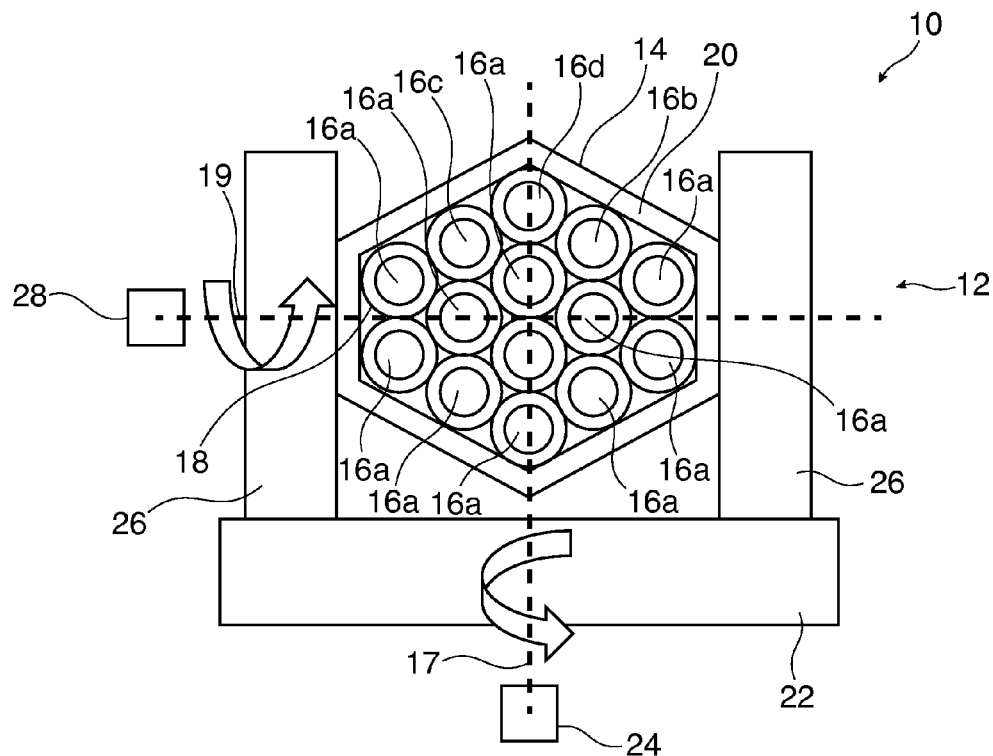
FIG. 1 is a schematic front view of a laser illumination unit according to a first embodiment of the invention.
Figure 2:
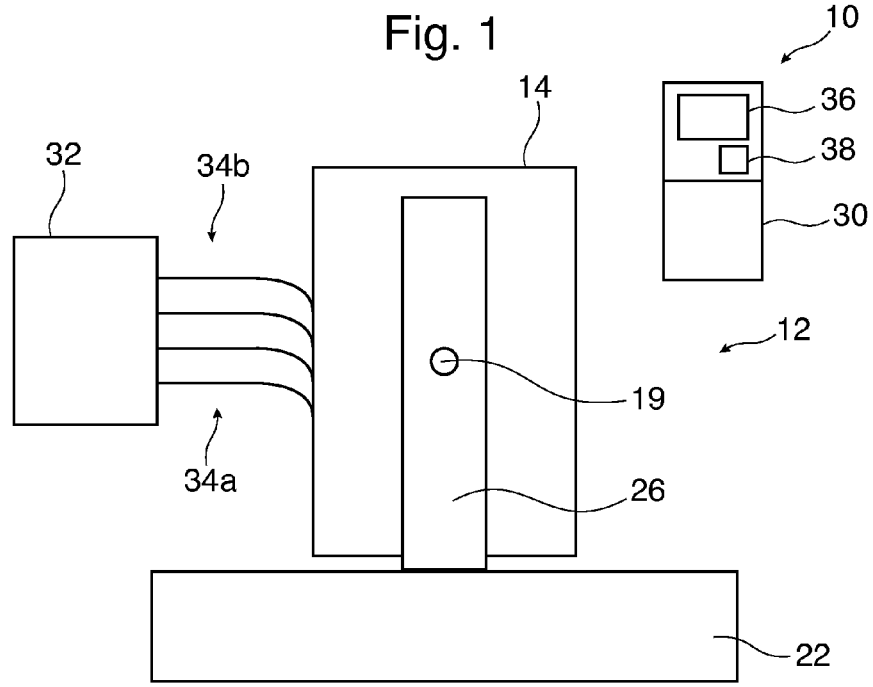
FIG. 2 is a schematic side view of the laser illumination unit in FIG. 1.

FIG. 1 and FIG. 2 depict a laser illumination unit 10 that includes an aiming unit 12 that is designed to aim a bundling unit 14 comprising modules 16a, 16b, 16c, 16d. Modules 16a, 16b, 16c, 16d include a plurality of high-power laser beam modules 16a, a target-marking laser beam module 16b, a target illumination beam module 16c, and a camera module 16d.

Modules 16a, 16b, 16c, 16d include identical or identically constructed cylindrical housings 18 that can have a circular cross-section. Bundling unit 14 bundles modules 16a, 16b, 16c, 16d by way of a rigid frame 20 into a parallel bundle in which modules 16a, 16b, 16c, 16d, or housings 18 are arranged in parallel relative to each other in a honeycomb pattern.

Modules 16b, 16c, 16d are disposed on the top rim of the bundle, camera module 16d being located at the center.

The paraxial alignment of modules 16a, 16b, 16c, 16d, or housing 18 can be a few hundred mrad. The size of bundling unit 14 can be dimensioned individually based on the number of required modules 16a, 16b, 16c, 16d.

In order to provide rough aiming of the laser radiation emanating from modules 16a, 16b, 16c, 16d at a target or target object, bundling unit 14 is movably attached to aiming unit 12. Bundling unit 14 can be aligned in two axes 17, 19 by aiming unit 12.

Aiming unit 12 includes an azimuth rotational unit 22 that can be rotated, for example, by an actuator 24 about axis 17. Aiming unit 14 furthermore includes an elevation rotational unit 26 by which bundling unit 14 can be rotated, for example, by an actuator 28 about axis 19.

Both actuators 24, 28 can include, for example, electric motors that are controlled by a controller 30 (see FIG. 2).

The laser light for high-power laser beam modules 16a and target-marking laser beam module 16b is generated in a laser module 32 that accommodates a plurality of fiber lasers 34a, 34b which are connected to laser modules 16a, 16b. Coupling fiber lasers 34a, 34b into individual modules 16a, 16b is effected through fibers 34a, 34b that are connected, for example, to a plug connector of each module 16a, 16b.

Laser module 32 can be decoupled mechanically from aiming unit 12, with the result that the module is not moved along with aiming unit 12 when this unit is aimed at the target object.

In addition, laser illumination unit 10 can include a display screen 36 on which an image generated by camera module 16d can be displayed, and an operating unit 38 by which a person can roughly aim laser illumination unit 10 and mark a target object on display screen 36.

Figure 3:
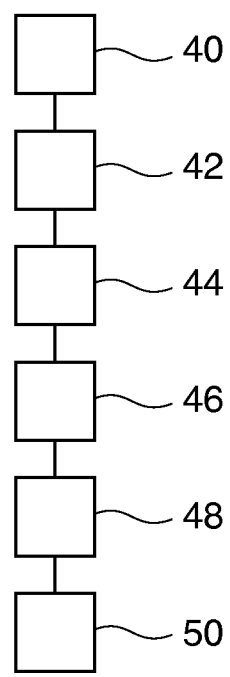
FIG. 3 is a flowchart of a method for illuminating a target object with high-power laser light according to one embodiment of the invention.

FIG. 3 is a flowchart of a method for illuminating a target object with high-power laser light, which method can be implemented by laser illumination unit 10.

In step 40, aiming unit 12 is aimed by camera module 16d at the target object to be illuminated. To accomplish this, for example, the actual image of camera module 16d can be displayed on display screen 36 and a person can use operating unit 38 (for example a joystick) to move aiming unit 12. Controller 30 then generates control commands that are sent to actuators 24, 28.

A target point is selected in step 42. This can be performed, for example, by a person who uses operating unit 38 and display screen 36 to mark the target point on the target object. It is also possible for the target point to be determined by controller 30 by way of pattern recognition.

In step 44, the entire surface of the target point is illuminated by target illumination beam module 16c. Target illumination beam module 16c can, for example, generate an enhanced laser beam to illuminate the entire surface of a target object.

In step 46, a beam of a target-marking laser, coming from laser module 16b for target-marking laser radiation, is aimed at and focused on the selected target point. This is described in more detail with reference to FIG. 5.

In step 48, the beam axes of laser modules 16a for high-power laser radiation are aimed at and focused on the selected target point by way of the radiation received from the target-marking laser. This is described in more detail with reference to FIG. 4.

In step 50, illumination of the target object is effected by the high-power laser radiation from high-power laser beam modules 16a.

Steps 40 through 50 illustrate the pattern over time by which material processing of the target object can be implemented at a great distance.

Figure 4:
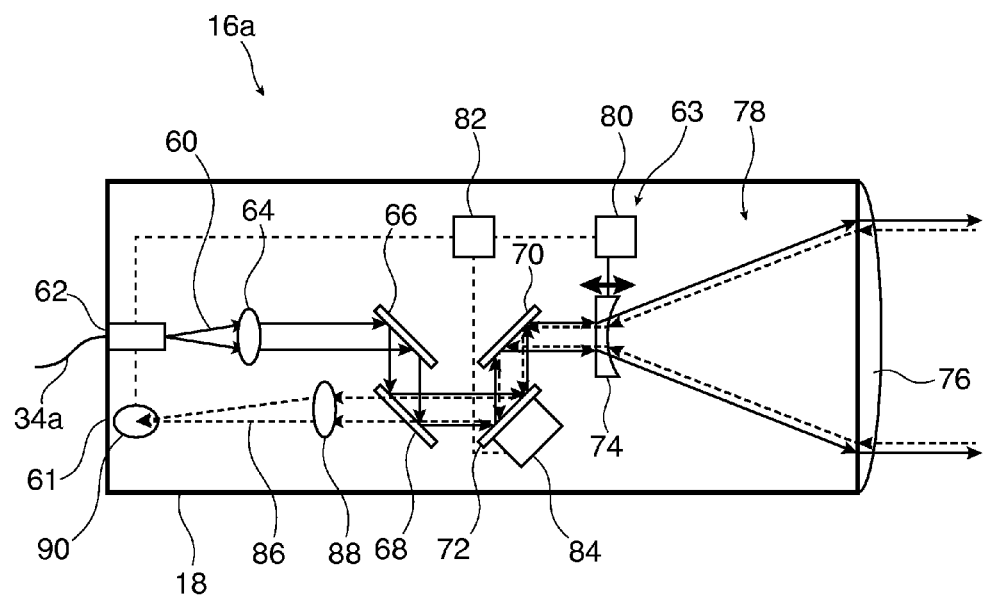
FIG. 4 is a schematic cross-sectional view of a high-power laser beam module for a laser illumination unit according to one embodiment of the invention.

FIG. 4 is a schematic view of laser module 16a for high-power laser radiation 60.

Laser module 16a provides precision aiming and focusing of radiation 60 from high-power fiber laser 34a. These fiber lasers are commercially available as single-mode lasers up to a power level of 10 kW. The wavelength of radiation 60 is typically 1.07 µm (infrared).

Laser module 16a includes a rigid tubular housing 18 that can, for example, have a diameter of 20 cm. The length of housing 18 is, for example, approximately 1 m.

One end of the housing includes a cover 61 that closes off the housing at this end. Cover 61 has a fiber plug connector 62 at the center into which outgoing fiber 34a of high-power laser 32 can be coupled.

An optical element 63 is located inside housing 18 and can include multiple lenses, deflection mirrors, actuators, and a detector.

The divergent beam from output laser 34a is parallel-collimated by a lens 64, deflected in each case by 90° by deflection mirrors 66, 68, 70, 72, and emitted to the outside by the expansion telescope 78 created by the planoconcave lens 74 and the planoconvex lens 76. Lens 76 here closes off the other end of housing 18.

High-power laser radiation 60 from fiber 34a can be focused by telescope 78, which is created by lenses 74, 76, on the target point on the target object.

The diameter of lens 76 is, for example, 20 cm; its focal length can be, for example, 50 cm. The diameter of lens 74 is, for example, 4 cm; its focal length can be, for example, 10 cm. Varying the typical distance between both lenses 74, 76 of, for example, approximately 40 cm, by shifting lens 74 in the longitudinal axis of laser module 16a a few centimeters enables the laser beam from fiber 34a to be focused on the target point. To this end laser module 16a can include an actuator 80 that can be controlled by a controller 82. The controller can be located in housing 18 of laser module 16a.

High-power laser radiation 60 from fiber 34a can be aimed at the target point on the target object by deflection mirror 72. Deflection mirror 72 can be moved in two axes. Laser module 16a can include another actuator 84 for this purpose that can also be controlled by controller 82. For example, actuator 84 can adjust with high precision a support plate of deflection mirror 72 within the small angular range of a few mrad.

Laser radiation 86 coming from target-marking laser beam module 16b is used to determine the position of deflection mirror 72 and telescope 78 at which the high-power laser radiation is aimed at and focused on the target point.

Laser radiation 86 is the light of a target-marking laser contained in laser module 16b and reflected from the target point. Laser radiation 86 exhibits a wavelength different from that of radiation 60.

Laser radiation 86 is received through lens 76 and directed through lens 74, deflection mirror 70, and deflection mirror 72. Deflection mirror 68 has a coating that is transparent to the wavelength of target-marking laser radiation 86 (but reflects radiation 60), and this radiation thus passes through this coating. Radiation 86 is then focused onto a position-sensitive detector 90 by lens 88. Detector 90 can be, for example, a quadrant detector.

Controller 86 receives the detector signals from detector 90, evaluates these, and computes the angular deviation (i.e., the angle error) of received radiation 86. Controller 82 then adjusts deflection mirror 72 (by activating actuator 84) and/or telescope 78 (by activating actuator 80).

The distance to the target point can also be determined based on the propagation time for the received signal of detector 90.

Figure 5:
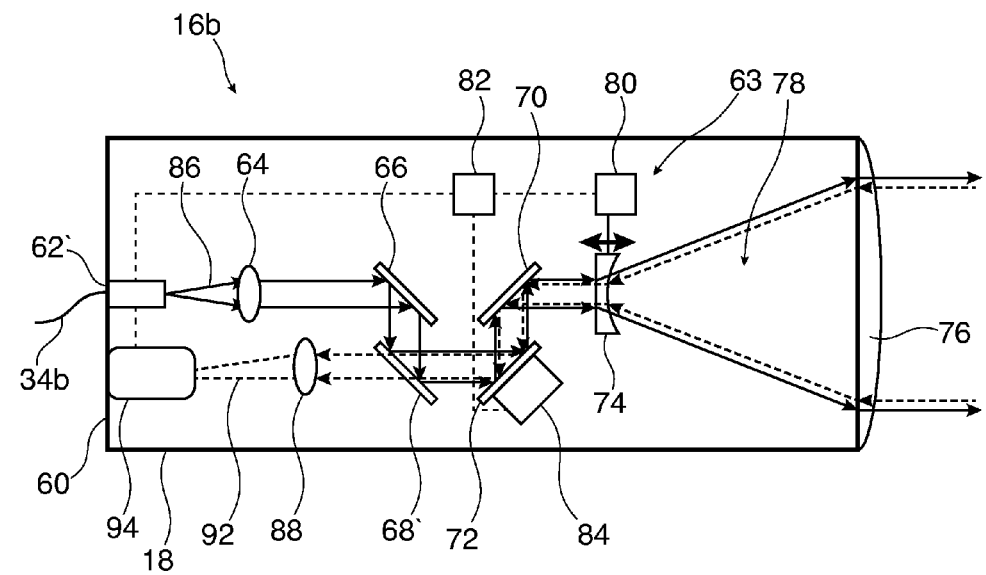
FIG. 5. is a schematic cross-sectional view of a high-power laser beam module for a laser illumination unit according to one embodiment of the invention.

FIG. 5 depicts the constructive design of laser module 16*b* for target-marking laser radiation 86. Except for the following exceptional cases, the constructive design of laser module 16*b* can be identical to the constructive design of laser module 16*a* in FIG. 4.

Fiber plug connector 62' is designed to accept fiber end 34*b* of a target-marking laser. Target-marking laser is, for example, a pulsed laser with a wavelength of 532 nm (for example visible light).

Deflection mirror 68' reflects radiation 68 but is transparent to radiation 92 from target illumination laser module 16*c*. Deflection mirror 68', for example, can be provided with a coating that is highly reflective in the wavelength region of target-marking laser radiation 86.

In addition, laser module 16*b* includes an imaging camera 94 in place of position-sensitive detector 90. Camera 94 can be used to receive an image from a target object in the wavelength region outside the wavelength of target-marking laser radiation 86. The light or radiation 92 can emanate, for example, from laser module 16*c*. The optical axis of camera 94 is coordinated with the optical axis of target-marking laser radiation 86.

The image received by camera 94 can be received by controller 82, transferred to controller 30, and/or displayed, for example, on display screen 36. A person can use this image, for example, to select the target point on the target object.

Selecting the target point enables deflection mirror 72 to be aimed at the target point, and/or telescope 78 to be focused on the target point. As a result, the optical axis of laser module 16*b* is aligned with the target point, and radiation 86 from the target-marking laser is aimed at and focused on the target point.

Figure 6:
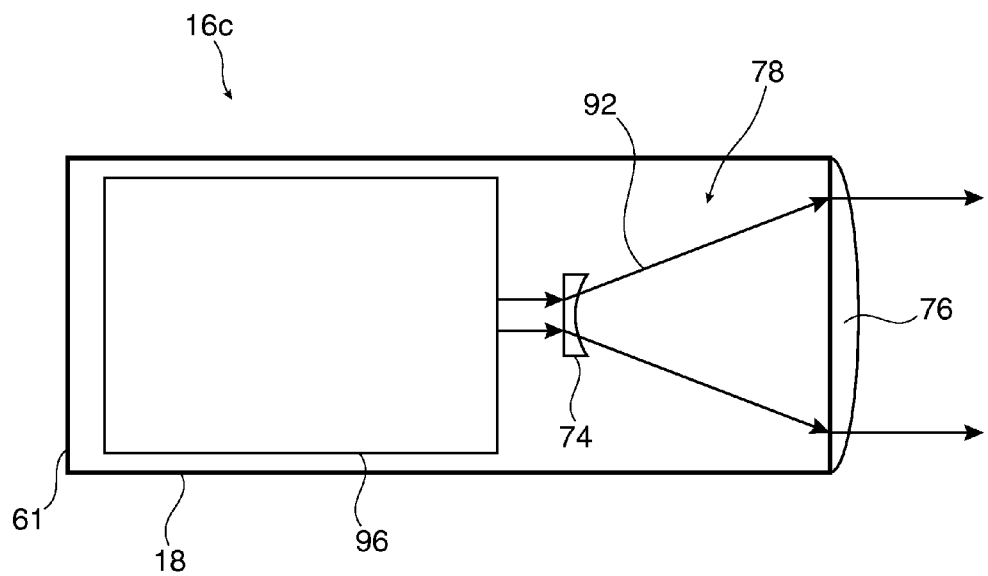
FIG. 6 is a schematic cross-sectional view of a target-marking laser beam module for a laser illumination unit according to one embodiment of the invention.

FIG. 6 depicts laser module 16*c* for illuminating the target. In order to illuminate the entire surface of the target object when the existing external illumination is insufficient, laser module 16*c* can be used to illuminate the target.

Just as with laser modules 16*a*, 16*b*, laser module 16*c* includes a tubular housing 18 and a telescope 78 that is composed of lenses 74 and 76. Telescope 78 radiates the light from target illumination laser 96 onto the target object at an angle of typically a few mrad. Target illumination laser 96 that generates radiation 92 is located in housing 18.

The wavelength of radiation 92 is typically around 900 nm (near infrared).

Figure 7:
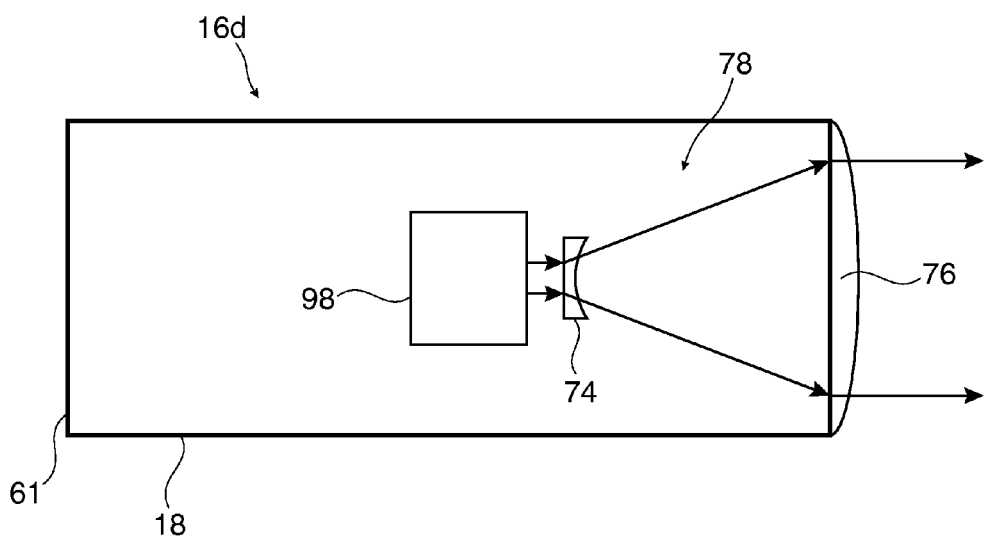
FIG. 7 is a schematic cross-sectional view of a camera module for a laser illumination unit according to one embodiment of the invention.

FIG. 7 depicts camera module 16*d* for roughly aiming unit 12.

Camera module 16*d* functions to aim bundled modules 16*a*, 16*b*, 16*c*, 16*d* at the target object. Two-axis aiming unit 12 is operated for this purpose.

Analogous to laser module 16*c*, camera module 16*d* includes a telescope 78 in housing 18. Camera module 16*d* furthermore includes an imaging camera 98.

It must be added that in the claims "comprising" does not exclude other elements or steps, and "a" or "one" does not exclude a plurality. It must furthermore be noted that features of steps that have been described with reference to one of the above exemplary embodiments can also be used in combination with other features or steps of other above-described exemplary embodiments. Reference numerals must not be viewed as restrictions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Laser illumination unit for illuminating a target object with high-power laser radiation, the laser illumination unit comprising:
   multiple rigidly-interconnected laser beam modules that are designed to emit laser radiation; and
   an aiming unit to aim the laser beam modules at the target object,
   wherein each of the laser beam modules includes an optical element that is designed to aim laser radiation at a target point of the target object,
   wherein the multiple first laser beam modules are designed to emit first laser radiation of a first wavelength,
   wherein a second laser beam module is designed to emit second laser radiation of a second wavelength and focus the radiation on a target point,
   wherein the first laser beam modules are designed to detect the second laser radiation by way of a detector, and
   wherein the first laser beam modules include an adjustable optical element that aims the incoming second laser radiation at the detector and simultaneously aims the first laser radiation at the target point.

2. Laser illumination unit according to claim 1,
   wherein the optical element of a laser beam module includes a detector for detecting incoming radiation.

3. Laser illumination unit according to claim 1,
   wherein the optical element of a laser beam module includes an adjustable telescope that is designed to focus emitted laser radiation onto the target point, and to focus incoming radiation onto a detector.

4. Laser illumination unit according to claim 2,
   wherein the optical element of a laser beam module includes an adjustable telescope that is designed to focus emitted laser radiation onto the target point, and to focus incoming radiation onto a detector.

5. Laser illumination unit according to claim 1,
   wherein the optical element of a laser beam module includes an adjustable deflection mirror that is designed to aim emitted laser radiation at the target point and aim incoming radiation at a detector.

6. Laser illumination unit according to claim 1,
   wherein the optical element of a laser beam module includes a semitransparent mirror that reflects emitted laser radiation and is transparent to incoming radiation.

7. Laser illumination unit according to claim 1,
   wherein a laser beam module includes a controller that is designed to control an actuator of an adjustable telescope and/or an actuator of and adjustable deflection mirror.

8. Laser illumination unit according to claim 1, further comprising:
   multiple laser sources that are designed to generate laser radiation and that are each connected by an optical fiber to a laser beam module;
   wherein the aiming unit is designed to move the laser beam modules independently of the laser sources.

9. Laser illumination unit according to claim 1,
wherein the first laser radiation is able to process the target object.

10. Laser illumination unit according to claim 1,
wherein the second laser beam module is designed to detect an illumination beam by way of a second detector,
wherein the second laser beam module includes an adjustable optical element that aims the incoming illumination radiation at the second detector and simultaneously aims the emitted second laser radiation at the target point.

11. Laser illumination unit according to claim 1,
wherein the optical element of the laser beam modules are of identical constructive design.

12. Laser illumination unit according to claim 1, further comprising:
a target illumination laser module rigidly attached to the laser beam modules, which target illumination laser module includes an illumination source to generate illumination radiation and a telescope to focus the illumination radiation.

13. Laser illumination unit according to claim 1, further comprising:
a camera module that is rigidly attached to the laser beam modules, which camera module includes a camera and a telescope.

14. Laser illumination unit according to claim 12, further comprising:
a camera module that is rigidly attached to the laser beam modules, which camera module includes a camera and a telescope.

15. Laser illumination unit according to claim 1,
wherein the laser beam modules each include a tubular housing;
wherein the tubular housings are combined to form a bundle that is moveable by the aiming unit.

16. Method for illuminating a target object with high-power laser radiation, the method comprising the steps of:
detecting a target point of the target object by a detector, wherein the detector is designed to detect a wavelength that differs from a wavelength of target acquisition laser radiation;
aiming a target-marking laser beam at the target point by a target-marking laser beam module;
adjusting an optical element of a processing laser beam module so that target-marking laser radiation is aimed at a detector of the processing laser beam module, wherein the detector is designed to detect a wavelength of the target-marking laser radiation;
illuminating the target point by a processing laser beam, wherein the processing laser beam is aimed by the optical element of the processing laser beam module, which optical element also aims the target-marking laser radiation at the detector of the processing laser beam module.

* * * * *